US007103807B2

(12) United States Patent
Bosa et al.

(10) Patent No.: US 7,103,807 B2
(45) Date of Patent: Sep. 5, 2006

(54) SYSTEMS AND METHODS FOR ISOLATING FAULTS IN COMPUTER NETWORKS

(75) Inventors: Patrick A. Bosa, Exeter, NH (US); Joseph Greenwald, Madbury, NH (US); Christopher Buia, Dover, NH (US); Thomas S. Pantelis, Portsmouth, NH (US); Scott Ball, Newmarket, NH (US)

(73) Assignee: Computer Associates Think, Inc., Islandia, NY (US)

( * ) Notice: Subject to any disclaimer, the term of this patent is extended or adjusted under 35 U.S.C. 154(b) by 507 days.

(21) Appl. No.: 10/287,974

(22) Filed: Nov. 5, 2002

(65) Prior Publication Data

US 2003/0051195 A1 Mar. 13, 2003

Related U.S. Application Data

(63) Continuation-in-part of application No. PCT/US01/14815, filed on May 7, 2001, which is a continuation-in-part of application No. PCT/US01/14767, filed on May 7, 2001, and a continuation-in-part of application No. PCT/US01/14618, filed on May 7, 2001, and a continuation-in-part of application No. PCT/US01/14557, filed on May 7, 2001, and a continuation-in-part of application No. PCT/US01/14766, filed on May 7, 2001.

(60) Provisional application No. 60/202,297, filed on May 5, 2000, provisional application No. 60/202,296, filed on May 5, 2000, provisional application No. 60/202,299, filed on May 5, 2000.

(51) Int. Cl.
*G06F 11/00* (2006.01)

(52) U.S. Cl. ........................................ 714/43
(58) Field of Classification Search .................. 714/43
See application file for complete search history.

(56) References Cited

U.S. PATENT DOCUMENTS

| 4,827,411 A | 5/1989 | Arrowood et al. ........... 707/206 |
| 5,127,005 A | 6/1992 | Oda et al. ..................... 714/26 |
| 5,159,685 A | 10/1992 | Kung .......................... 395/575 |
| 5,261,044 A | 11/1993 | Dev et al. ................... 395/159 |
| 5,297,138 A | 3/1994 | Black .......................... 370/254 |
| 5,367,667 A | 11/1994 | Wahlquist et al. .......... 395/575 |
| 5,377,196 A | 12/1994 | Godlew et al. ............. 371/20.1 |
| 5,436,909 A | 7/1995 | Dev et al. ................... 371/20.1 |
| 5,521,910 A | 5/1996 | Matthews ..................... 370/54 |
| 5,559,955 A | 9/1996 | Dev et al. ............. 395/182.02 |
| 5,590,120 A | 12/1996 | Vaishnavi et al. .......... 370/254 |
| 5,608,874 A | 3/1997 | Ogawa et al. ......... 395/200.15 |
| 5,627,819 A | 5/1997 | Dev ............................. 370/250 |

(Continued)

OTHER PUBLICATIONS

International Search Report issued in PCT/US01/14815 dated Dec. 19, 2001.

*Primary Examiner*—Bryce P. Bonzo
*Assistant Examiner*—Joshua Lohn
(74) *Attorney, Agent, or Firm*—Pillsbury Winthrop Shaw Pittman LLP

(57) ABSTRACT

A system or a method is designed to detect and suppress faults on network elements located in various logical groups. The system and method of fault status suppression in a communications network includes receiving fault data from a detector identifying fault status of a network element; mapping logical group of the detector and the network element; and suppressing fault on the network element when the detector and the network element are in different logical groups and there is a fault on a device providing communication between the logical groups.

15 Claims, 12 Drawing Sheets

U.S. PATENT DOCUMENTS

| | | | |
|---|---|---|---|
| 5,649,103 A | 7/1997 | Datta et al. | 395/200.03 |
| 5,666,481 A | 9/1997 | Lewis | 395/182.02 |
| 5,675,741 A | 10/1997 | Aggarwal | 395/200.12 |
| 5,687,290 A | 11/1997 | Lewis | 395/3 |
| 5,691,917 A | 11/1997 | Harrison | 717/6 |
| 5,696,486 A | 12/1997 | Poliquin et al. | 340/506 |
| 5,706,436 A | 1/1998 | Lewis et al. | 395/200.11 |
| 5,727,157 A | 3/1998 | Orr et al. | 395/200.54 |
| 5,729,685 A | 3/1998 | Chatwani et al. | 709/224 |
| 5,734,642 A | 3/1998 | Vaishnavi et al. | 370/255 |
| 5,734,824 A | 3/1998 | Choi | 395/200.11 |
| 5,748,781 A | 5/1998 | Datta et al. | 382/232 |
| 5,751,965 A | 5/1998 | Mayo et al. | 395/200.54 |
| 5,751,967 A * | 5/1998 | Raab et al. | 709/228 |
| 5,768,501 A | 6/1998 | Lewis | 395/185.01 |
| 5,777,549 A | 7/1998 | Arrowsmith et al. | 340/506 |
| 5,787,234 A | 7/1998 | Molloy | 395/51 |
| 5,793,362 A | 8/1998 | Matthews et al. | 395/200.54 |
| 5,832,503 A | 11/1998 | Malik et al. | 707/104 |
| 5,850,397 A | 12/1998 | Raab et al. | 370/392 |
| 5,864,662 A | 1/1999 | Brownmiller et al. | 714/43 |
| 5,889,953 A | 3/1999 | Thebaut et al. | 395/200.51 |
| 5,907,696 A | 5/1999 | Stilwell et al. | 395/500 |
| 5,987,442 A | 11/1999 | Lewis et al. | 706/10 |
| 6,003,090 A | 12/1999 | Puranik et al. | 709/235 |
| 6,014,697 A | 1/2000 | Lewis et al. | 709/223 |
| 6,026,442 A | 2/2000 | Lewis et al. | 709/229 |
| 6,026,500 A | 2/2000 | Topff et al. | 714/26 |
| 6,041,383 A | 3/2000 | Jeffords et al. | 710/200 |
| 6,064,304 A | 5/2000 | Arrowsmith et al. | 340/506 |
| 6,069,895 A | 5/2000 | Ayandeh | 370/399 |
| 6,079,020 A | 6/2000 | Liu | 713/201 |
| 6,084,858 A | 7/2000 | Matthews et al. | 370/238 |
| 6,101,180 A | 8/2000 | Donahue et al. | 370/352 |
| 6,101,500 A | 8/2000 | Lau | 707/103 |
| 6,112,251 A | 8/2000 | Rijhsinghani | 709/249 |
| 6,115,362 A | 9/2000 | Bosa et al. | 370/248 |
| 6,131,112 A | 10/2000 | Lewis et al. | 709/207 |
| 6,141,720 A | 10/2000 | Jeffords et al. | 710/200 |
| 6,147,995 A | 11/2000 | Dobbins et al. | 370/392 |
| 6,158,011 A | 12/2000 | Chen et al. | 713/201 |
| 6,173,399 B1 | 1/2001 | Gilbrech | 713/153 |
| 6,185,619 B1 | 2/2001 | Joffe et al. | 709/229 |
| 6,195,349 B1 | 2/2001 | Hiscock et al. | 370/360 |
| 6,199,172 B1 | 3/2001 | Dube et al. | 714/4 |
| 6,205,488 B1 | 3/2001 | Casey et al. | 709/238 |
| 6,216,168 B1 | 4/2001 | Dev et al. | 709/245 |
| 6,230,194 B1 | 5/2001 | Frailong et al. | |
| 6,233,623 B1 | 5/2001 | Jeffords et al. | 709/316 |
| 6,324,590 B1 | 11/2001 | Jeffords et al. | 709/316 |
| 6,349,306 B1 | 2/2002 | Malik et al. | 707/103 |
| 6,392,667 B1 | 5/2002 | McKinnon et al. | 345/738 |
| 2002/0133756 A1* | 9/2002 | Jain | 714/43 |
| 2003/0069972 A1* | 4/2003 | Yoshimura et al. | 709/226 |

* cited by examiner

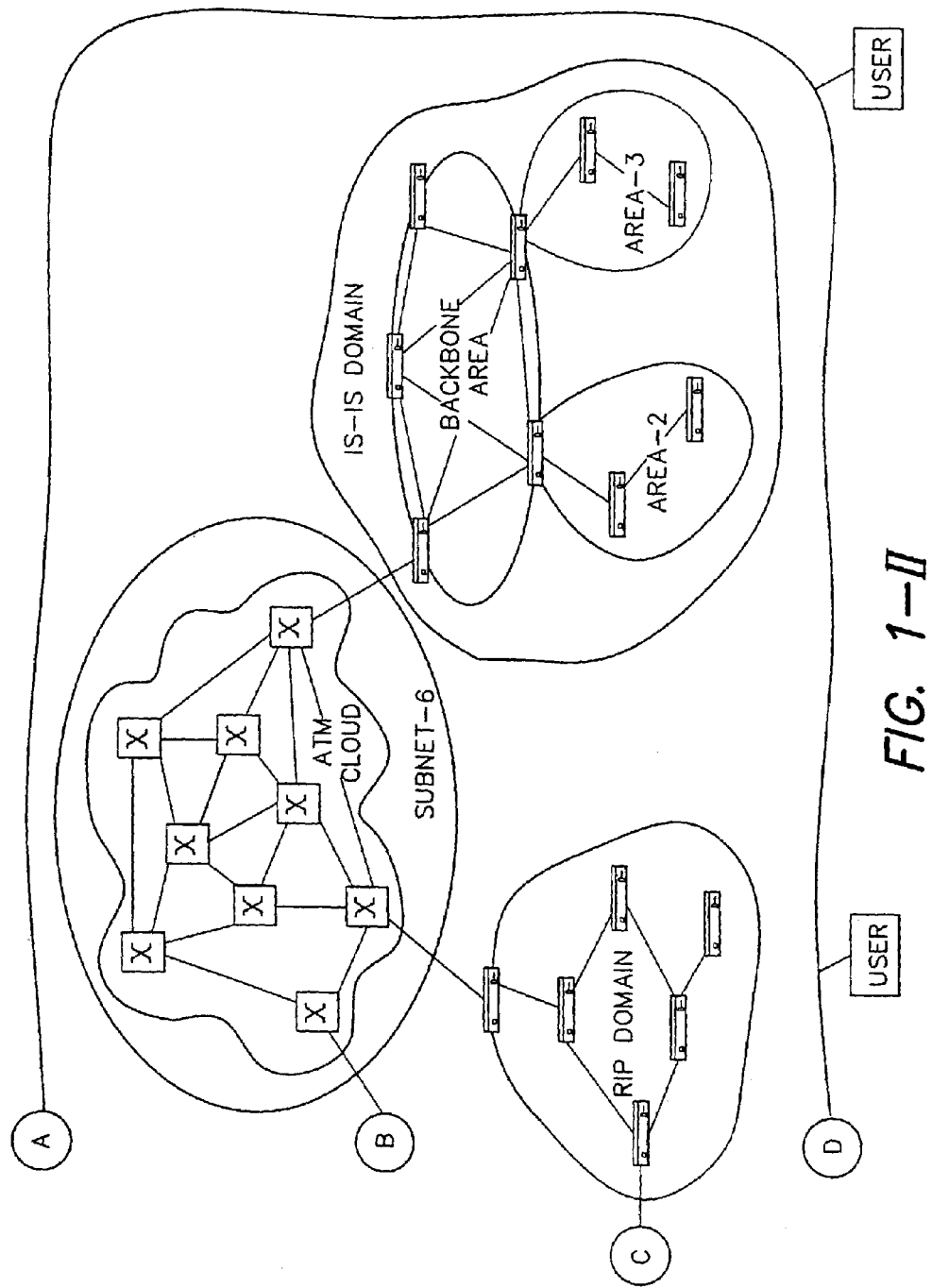
FIG. 1-II

SYSTEMS AND METHODS FOR ISOLATING FAULTS IN COMPUTER NETWORKS

This application claims priority from PCT Application PCT/US01/14815 filed May 7, 2001, which claims priority from U.S. Provisional Application 60/202,297, entitled "A Method of Improving the Status Suppression of a Network Management System by Considering The Logical Layers That Partition Networks into Groups as Well as the Network Elements that Connect these Partitions Together," filed on May 5, 2000, and claims priority from U.S. Provisional Application 60/202,296, entitled "Construction of a Very Rich, Multi-layer Topological Model of a Computer Network for Purposes of Fault Diagnosis," filed on May 5, 2000, and claims priority from U.S. Provisional Application 60/202,299, entitled "A Method for Diagnosing Faults in Large Multilayered Environments Guided by Path And Dependency Analysis of the Modeled System," filed on May 5, 2000, all of which are incorporated by reference in their entireties. This application also claims priority from co-pending PCT Applications PCT/US01/14767, PCT/US01/14618, PCT/US01/14557, and PCT/US01/14766 all of filed May 5, 2001 which are incorporated by reference for all purposes.

GENERAL DESCRIPTION

The invention relates to a system and a method for detecting and suppressing faults on network elements located in various logical groups.

The construction of computer networks started on a large scale in the 1970's. Computer networks link personal computers, workstations, servers, storage devices, printers and other devices. Historically, wide area computer networks (WANs) have enabled communications across large geographic areas, and local area networks (LANs) communications at individual locations. Both WANs and LANs have enabled sharing of network applications such as electronic mail, file transfer, host access and shared databases. Furthermore, WANs and LANs have enabled efficient transfer of information, and sharing of resources, which in turn increased user productivity. Clearly, communications networks have become vitally important for businesses and individuals.

Communications networks usually transmit digital data in frames or packets created according to predefined protocols that define their format. Data frames include headers (located at the beginning and containing addresses), footers (located at the end of the frames), and data fields that include the transmitted data bits (payload). Data frames may have a fixed or variable length according to the used protocol or network type.

A communications network transmits data from one end station (i.e., a computer, workstation, server etc.) to another using a hierarchy of protocol layers (i.e., layers that are hierarchically stacked). In the communication process, each layer in the source communicates with the corresponding layer in the destination in accordance with a protocol defining the rules of communication. This is actually achieved by transferring information down from one layer to another across the layer stack, transmitting across a communication medium, and then transferring information back up the successive protocol layers on the other end. To facilitate better understanding, however, one can visualize a protocol layer communicating with its counterparts at the same layer level.

The open system interconnection (OSI) model has seven layers that define the rules for transferring information between the stations. A physical layer (Layer 1) is responsible for the transmission of bit streams across a particular physical transmission medium. This layer involves a connection between two endpoints allowing electrical signals to be exchanged between them.

A data link layer (Layer 2) is responsible for moving information across a particular link by packaging raw bits into logically structured packets or frames. Layer 2 ensures good transmission and correct delivery by checking errors, re-transmitting as necessary, and attaching appropriate addresses to the data sent across a physical medium. If a destination computer does not send an acknowledgment of frame receipt, Layer 2 resends the frame. The contention access methods (e.g., CSMA/CD, and Token Passing) are regarded as Layer 2 activities. Layer 2 may be further divided into two sub-layers: Logical Link Control (LLC) and Media Access Control (MAC). The MAC sublayer defines procedures the stations must follow to share the link and controls access to the transmission link in an orderly manner. The MAC sublayer defines a hardware or data link address called a MAC address. The MAC address is unique for each station so that multiple stations can share the same medium and still uniquely identify each other. The LLC sublayer manages communications between devices over a single link of the communications network.

A network layer (Layer 3) is set up to route data from one network user to another. Layer 3 is responsible for establishing, maintaining, and terminating the network connection between two users and for transferring data along that connection. Layer 3 addresses, messages, and determines the route along the network from the source to the destination computer. Layer 3 manages traffic, such as switching, routing, and controlling the congestion of data transmissions.

A transport layer (Layer 4) is responsible for providing data transfer between two users at an agreed level of quality. When a connection is established, this layer is responsible for selecting a particular quality of service (QoS), for monitoring transmissions to ensure the selected QoS, and for notifying the users if the QoS deteriorates. Layer 4 also provides for error recognition and recovery, repackaging of long messages into smaller frames of information, and acknowledgments of receipt.

A session layer (Layer 5) focuses on providing services used to organize communication and synchronize the dialog that takes place between users and to manage the data exchange. The primary concern of Layer 5 is controlling when users can send and receive concurrently or alternately. A presentation layer (Layer 6) is responsible for the presentation of information in a way that is meaningful to network users. This may include character code transmission, data conversion, or data compression and expansion.

Layer 6 translates data from both Layer 5 and from Layer 7 into an intermediate format and provides data encryption and compression services. Layer 7 is an application layer that provides means for application processes to access the system interconnection facilities in order to exchange information. This includes services used to establish and terminate the connections between users and to monitor and manage the systems being interconnected, as well as the various resources they employ.

As data is passed down through the layers, each layer may or may not add protocol information to the data, for example, by encapsulating frames with a header or removing the header, depending on the direction in the protocol stack. The individual protocols define the format of the headers.

MAC address includes a source address and a destination address, which have a predefined relationship to a network station. Higher network layers provide a network address that has a logical relationship established by a network administrator according to a predetermined network addressing arrangement. The assigned network address conveys information that can be used by a router when routing frames through the internetwork. If the network address is hierarchical, a router may use a portion of the address to route the packet to a higher-level partition or domain in the internetwork. Some protocols are hierarchical others are not so hierarchical routing may or may not be available.

The global network may be subdivided into IP networks, which in turn may be subdivided into subnets. An IP address includes a network number (assigned by IANA), a subnet number (assigned by a network administrator), and a host that identifies an end station. The host number may be assigned by a network administrator, or may be assigned dynamically. This is a form of hierarchical addressing that is used by IP routing algorithms to perform hierarchical or prefix routing operations. Routing algorithms maintain information of all higher-level routing environments in routing tables for domains by recording their shortest unique address prefixes.

A station may support more than one network layer protocol. Such station has multiple network addresses and multiple protocol stacks that present the same MAC address on a port for the different protocols. Thus, a multi-protocol stack station connected to both an IP and an IPX network includes an IP network address and an IPX network address.

A communications network may include a number of network entities (or nodes), a number of interconnecting links and communication devices. A network node is, for example, a personal computer, a network printer, file server or the like. An interconnecting link is, for example, an Ethernet, Token-Ring or other type network link. Communication devices include routers, switches, bridges or their equivalents. As computer networks have grown in size, network management systems that facilitate the management of network entities, communication links and communication devices have become necessary tools for a network administrator.

A bridge or a switch is a Layer 2 entity that is typically a computer with a plurality of ports for establishing connections to other entities. The bridging function includes receiving data from a port and transferring that data to other ports for receipt by other entities. A bridge moves data frames from one port to another using the end-station MAC address information contained in the switched frames. Switches interconnect the communication media to form small domains of stations, such as a subnetwork. Subnetworks or subnets provide an organizational overlay to an internetwork that facilitates transmission of data between the end stations, particularly for broadcast transmissions. The subnet functions to limit the proliferation of broadcast frames to stations within a broadcast domain.

A router is an intermediate station that interconnects domains or subnets by providing path from a node on a first network to a node on a second network. There are single protocol or multi-protocol routers, central or peripheral routers, and LAN or WAN routers. A peripheral router connects a network to a larger internetwork, and thus may be limited to a single protocol. A central router may be connected to a different board in a server or a hub and thus usually has a multi-protocol capability.

A router provides the path by first determining a route and then providing an initial connection for the path. A router executes network routing software that depends on the used protocol. A router can work with different data-link layer protocols and thus can connect networks using different architectures, for example, Ethernet to Token Ring to FDDI. Furthermore, there are routers of several levels, wherein, for example, a subnetwork router can communicate with a network router. Organizing a communications network into levels simplifies the routing tasks since a router needs to find only the level it must deal with. The use of different network levels is shown in FIG. 1.

In general, a global communications network connects devices separated by hundreds of kilometers. A LAN covers a limited area of maximum several kilometers in radius connecting devices in the same building or in a group of buildings. LANs usually include bridges or switches connecting several end-stations and a server. In a LAN, a bridge or a switch broadcasts traffic to all stations. Until a few years ago, a LAN was user-owned (did not run over leased lines) with gateways to public or other private networks. When a user moved or changed to an end-station at another location on the network, a network administrator had to rewire and reconfigure the user's station. This has changed with the introduction of virtual LANs.

A virtual LAN (VLAN) is a logical Layer 2 broadcast domain, which enables a logical segmentation of the network without changing the physical connections. A VLAN enabled switch segments the connected stations into logically defined groups. Broadcast traffic from a server or an end-stations in a particular VLAN is replicated only on those ports connected to end-stations belonging to that VLAN. The broadcast traffic is blocked from ports with no endpoints belonging to that VLAN, creating a similar type of broadcast containment that routers provide. VLANs may also be defined between different domains connected by a router. In this case, the router passes network traffic from one domain to the other (as done without defining a VLAN), and passes network traffic from one VLAN to the other. The router also passes network traffic between VLANs that are in the same domain because VLANs do not normally share user information. The router is configured as a member of all VLANS.

For example, an owner of a building (or campus) has completely wired the building (or campus) for networking. If the owner subleases parts of the wired building (or campus) to different tenants, the traffic from one tenant should not interfere with the traffic from another tenant. To accomplish this separation, each tenant is placed in its own VLAN, thereby completely separating network traffic. Thus, VLANs offer a significantly less expensive solution to private networks of this type. A VLAN uses a single physical network that can be partitioned into logically separate segments rather than having each tenant wire and support their own network. Routers, bridges and switches still provide the physical segmentation of the network.

There are several VLAN implementations and several methods used to determine VLAN membership. These methods include defining the membership by port, by MAC address, by protocol, by IP multicast address, by policy, or a combination of these methods. For port-based VLANs, IEEE 802.1Q defines an industry standard implementation. A large number of physical ports of a switch may be associated with a number of groups within the switch using a VLAN arrangement. This arrangement associates a port with a particular VLAN designation.

The VLAN designation is assigned (e.g., programmed) to each internal port and is stored in a memory portion of the switch. Every time a message is received by a switch on an internal port, the VLAN designation of that port is associated with the message.

Several switches can be interconnected to extend the VLAN port associations in the internetwork. This VLAN arrangement allows exchange of messages between all ports and entities of the network having the same VLAN designation by associating a VLAN designation with each message. This way the entities with the same VLAN designation operate as if they are all part of the same LAN. Each VLAN may be further associated with a subnet or broadcast domain so as to constrain broadcasting of frame messages to a defined subset of stations.

Virtual Private Networks (VPNs) have been designed to interconnect end-stations that are geographically dispersed. For example, owners of large communications networks can provide centralized management services to small and medium sized businesses. The provider can configure VPNs that interconnect various customer sites in geographically separate locations. These VPNs offer privacy and cost efficiency through sharing of network infrastructure. Various VPNs have been proposed with various degrees of security, privacy, scalability, ease of deployment and manageability.

A global communications network may use a different levels different routing and connection management protocols such as International Standards Organization (ISO) Open Systems Interface (OSI) Intermediate Systems to Intermediate Systems (IS—IS), and Internet Open Shortest Path First (OSPF) protocols are used for connectionless routing of data frames. Asynchronous Transfer Mode (ATM) Forum Private Network-Network-Interface (PNNI) protocol is used for connection oriented multi-media services. The routing protocols identify a network node using a global address of a Route Server Element (RSE). The RSEs generate routing that identifies optimal routes for communication throughout the network. The RSE is responsible for administration of the algorithms that enable a node to keep its view of the network topology and performance metric current, referred to as Routing Information Exchange (RIE). Thus an RSE usually acts as a central element for the routing of traffic through the node.

In general, the use of WANs, LANs, VPNs, and VLANs has increased the number and complexity of communications networks. These networks continuously evolve and change due to growth and introduction of new interconnections, topologies, protocols, or applications. Furthermore, most networks have redundant communication paths to prevent portions of the network from being isolated due to link failures. Also, multiple paths can be used simultaneously to load-balance data between the paths. However, redundant paths can also introduce problems such as formation of loops. Furthermore, network performance can degrade due to improper network configurations, inefficient or incorrect routing, redundant network traffic or other problems. Network hardware and software systems may also contain design flaws that affect network performance or limit access by users to certain of the resources on the network. These factors make network management complex and difficult.

A network management process controls and optimizes the efficiency and productivity of a communications network. A network management station manages the network entities (e.g., routers bridges switches, servers, storage devices, computers, printers) using a network management protocol such as a Simple Network Management Protocol (SNMP), Internet Control Message Protocol (ICMP), or another network management protocol known in the art. Using a network management protocol, the network management station can deliver information or receive information by actively polling the network entities or by receiving unsolicited information from the network entities. Using SNMP, a network management station can executes a set, get, or get-next functions to set and retrieve information from a network entity. This information may be stored within the polled network entity as Management Information Base (MIB). The network management station can receive unsolicited information from a network entity in the form of an SNMP trap. Network entities may send SNMP traps to the network management station when a problem in the network or network entity occurs.

A network management station may be implemented using any general purpose computer system, which is programmable using a high-level computer programming language or using specially programmed, special purpose hardware. The hardware includes a processor executing an operating system providing a platform for computer programs that run scheduling, debugging, input-output control, accounting compilation, storage assignment, data management, memory management, and communication control and other services. The application programs are written in high level programming languages.

A network management station can include a network manager unit, a network communication interface, a data acquisition unit, a data correlation unit, and a graphical user interface. The data correlation unit interprets data received through the data acquisition unit and presents the interpreted data to a user on the graphical user interface. The network communication interface may include transport protocols and LAN drivers used to communicate information to the communications network. The transport protocols may be IPX, TCP/IP or other well-known transport protocols. The LAN drivers may include software required to transmit data on a communications network through the network interface. The LAN drivers are generally provided by the manufacturer of the network interface for a general purpose computer for the purpose of communicating through the network interface. The network manager unit may be an SNMP network manager/agent implementing SNMP functions, or another type of network manager unit performing associated management functions. The network manager unit utilizes the network communication interface to transfer requests to network entities over a communications network.

A network management station may use a network management agent residing on a network entity. The network management agent may be a software process running on a processor or may be special purpose hardware. The network management agent may be an SNMP agent (or an ICMP agent), which may include a data collection unit, a network manager unit, and a network communication interface for communication as described above. For example, this communication may use network management functions such as SNMP functions. Alternatively, a network management agent, residing on a network entity, may include a data correlation unit, a data collection unit, a network manager unit and a network communication interface for communication.

In the network management station, the data correlation unit interprets data received through data acquisition unit. The data correlation unit may include an interface processor, a state processor, a hierarchical database, and one or more sets of object rules. The interface processor communicates with graphic libraries residing in the graphical user interface to present interpreted data to a user. The interface processor performs graphic functions associated with objects related to a network map or model. The graphic functions generate visual notifications to a user. The state processor performs correlation functions of the data correlation unit by requesting and receiving network management information from the data acquisition unit. The data acquisition unit stores data and requests information from the network manager.

In the network agent, the data correlation unit interprets data received by data collection unit. The state processor performs correlation functions of the data correlation unit by requesting and receiving network management information from the data collection unit. The data collection unit stores data and requests information from the network manager. In the network agent, the data collection unit can collect data from the network entity directly through its own network manager. The data collection and acquisition units can invoke network management commands within network manager libraries, which send and retrieve information from a network entity. These commands may be SNMP functions mentioned above, or ICMP functions. The state processor interprets data received from the network manager libraries in accordance with object rules. The object rules define how the state processor combines or parameterizes different properties of a network entity. The state processor can produce parameterized properties from the object rules.

SUMMARY OF THE INVENTION

The present invention is a system, a method and a product (that can be stored in a computer-readable storage medium) for detecting and suppressing faults on network elements located in various logical groups, wherein the logical groups include VLANs, VPNs, LAN Emulation over ATM, and other types of logical groups. The present system and method may also be used with one or more elements of a network management system described below.

According to one aspect, a system for fault status suppression in a communication network includes means for receiving fault data from a detector identifying fault status of a network element; means for mapping logical group of the detector and said network element; and means for suppressing a fault on the network element when the detector and the network element are in different logical groups and there is a fault on a device providing communication between the logical groups.

There are three main phases of the invention: the initial logical group mapping; logical group maintenance; and fault isolation between logical groups.

The advantage of the present system and method is that fault suppression in logically partitioned networks (such as VLANs, VPNs, LAN Emulation over ATM, etc.) in which a bounding network transit entity (such as a router, LAN Emulation server, or any other facility used to transfer traffic from one logical group to another) is at fault is now possible.

The present system and method improves upon a previous method of fault isolation by considering the forwarding and filtering behavior of the network elements when certain protocols partition the network into logical groups. Prior to detecting faults in the network, an NMS or some external process with an interface to the NMS will map out all the logical groups and the transit network elements that bound and connect the groups together. During this process, the NMS detects the membership, if any, of each managed element, including the computer on which a detector (e.g., a polling sub-system) of the NMS is running. During operation, when the NMS detects a fault in a managed element, the fault status of the element is suppressed if all of the following are true:

(a) the managed element in question is in a different logical group than the NMS polling subsystem;

(b) fault status is set on any network transit entity that is used in transferring traffic from the logical group containing the NMS polling subsystem and the logical group containing the managed element in question.

If the fault status of all routers located in the path to the managed element in question is clear, examination of the fault status of adjacent network elements proceeds as known in prior art, for example, U.S. Pat. No. 5,436,909, which is incorporated by reference.

In summary, a network management system periodically polls network elements. An element that does not respond to the manager's query is considered unreachable. The fault status of any unreachable element is suppressed when it can be inferred that the failure of another element is the cause of the element being unreachable. Prior art made this inference by examining the status of physically adjacent network elements, only. In a network involving logical groups (such as a VPN or VLAN environment), transit network entities (e.g., routers) may be responsible for unreachable status of another element even if the two elements are physically adjacent. By determining the logical topology of the network, the present system and method will identify a transit network entity (e.g., a router) that effects communication between the NMS and elements in any logical group. A fault suppressor suppresses the fault status of an unreachable element if such a transit network entity is also unreachable.

The present method and system enable identification of the logical groups in which managed elements in a computer network reside by examining the connectivity of network elements in relation to ports of the network elements. This is performed by a means of identifying the data-relay class of each network element.

DESCRIPTION OF PREFERRED EMBODIMENTS

Figure 1:
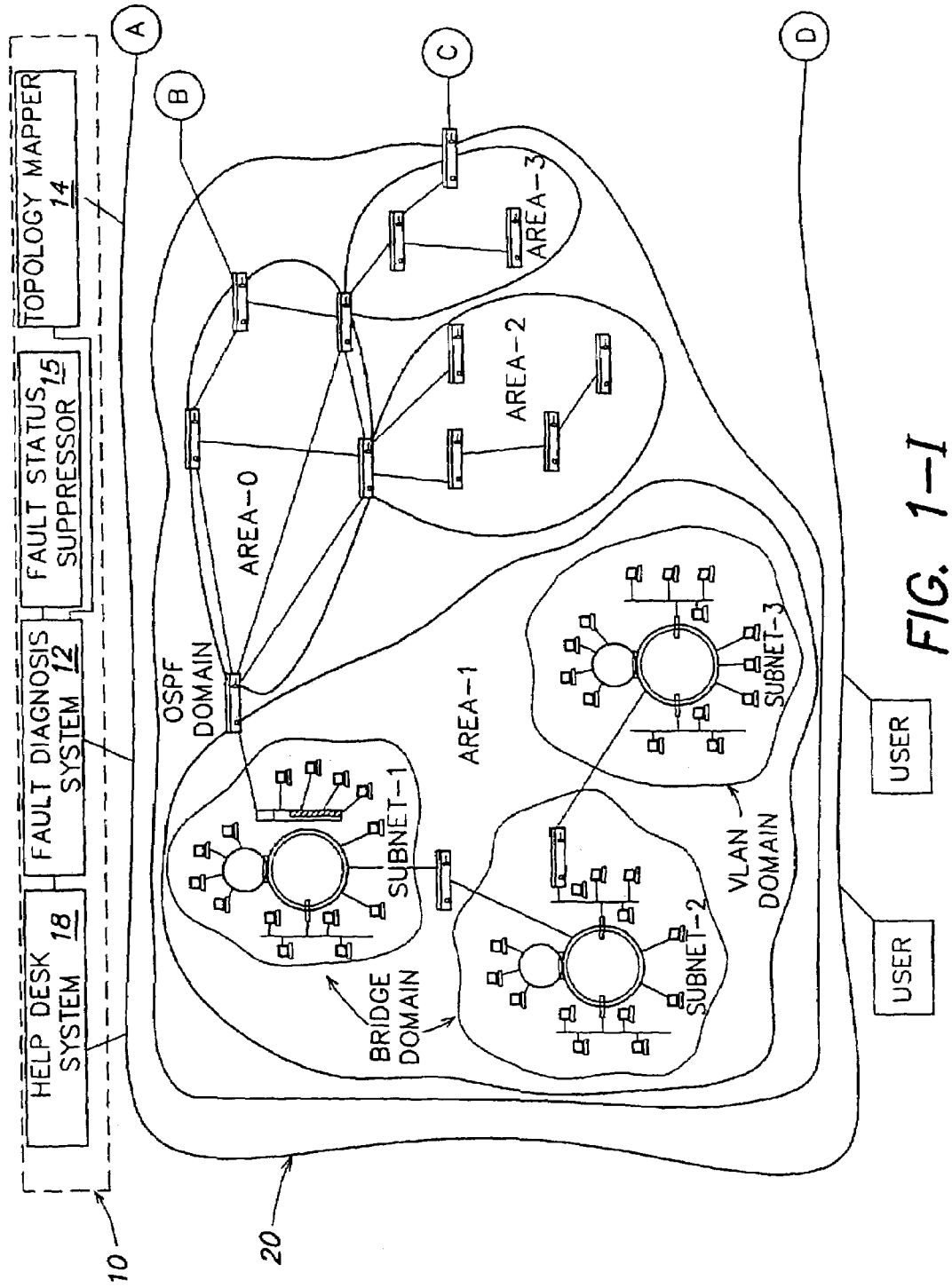
FIG. 1 shows diagrammatically a network management system connectable to a communications network.

FIG. 1 shows diagrammatically a network management system 10 including a fault diagnosis engine 12, a topology mapper 14, a fault status suppressor 15, and a help desk system 18. The network management system communicates with a communications network 20 (or application service). The network includes a set of interconnected network elements such as routers, bridges, switches, and repeaters. These network elements provide transportation of data between end stations. Furthermore, there are computers known as servers that provide services such as e-mail, accounting software, sales tools, etc. Typically, data is transmitted electronically or optically, and network elements can forward data in packets, frames or cells to the intended destination. Servers include network adapters and/or software that interpret the electronic or optical data packet into the data elements and pass these elements to the appropriate application being hosted.

The network management system 10 includes a commercially available processor (for example, Pentium microprocessor manufactured by Intel Corporation) executing an operating system providing an operating environment for a network management program. The processor and the operating, system provide a computer platform for which application programs are written in higher level programming languages. The computer (or application host) interfaces with permanent data storage, such as a magnetic or optical disk drive, a disk array, non-volatile RAM disk, or a storage area network, which maintain data files such as user configurations and policies. In general, the network management program may be configured as a generic software application residing in any commercially available computing platform.

Preferably, fault diagnosis engine 12, a fault status suppressor 15, topology mapper 14, and help desk system 18 are software applications written in JAVA and running on any computer with a Java Runtime Environment (JRE). For example, a Dell laptop computer with an Intel Pentium processor running the Windows 2000 operating system, or a Sun Ultra 60 computer running Solaris v. 2.7. Alternately, fault diagnosis engine 12, topology mapper 14, and help desk system 18 are developed in any object oriented or structured programming language, and compiled for execution on any one of many computer platforms, or could be implemented on a neural network computing device.

The computer has a network adaptor that provides communication (preferably, but not necessarily, IP) to the users on the network. The fault diagnosis engine application may share a host with help desk system, and/or the topology mapper, or each can run on a separate host, in which case they communicate using a network adaptor. Topology mapper 14 determines the network topology and creates a model. The permanent data storage holds data files that describe the current network topology, and configuration files that control the performance of topology mapper 14. A user is an end station, interfaced to access the network or services, used by a person who is using the network, or is using services provided by the network.

Figure 2:
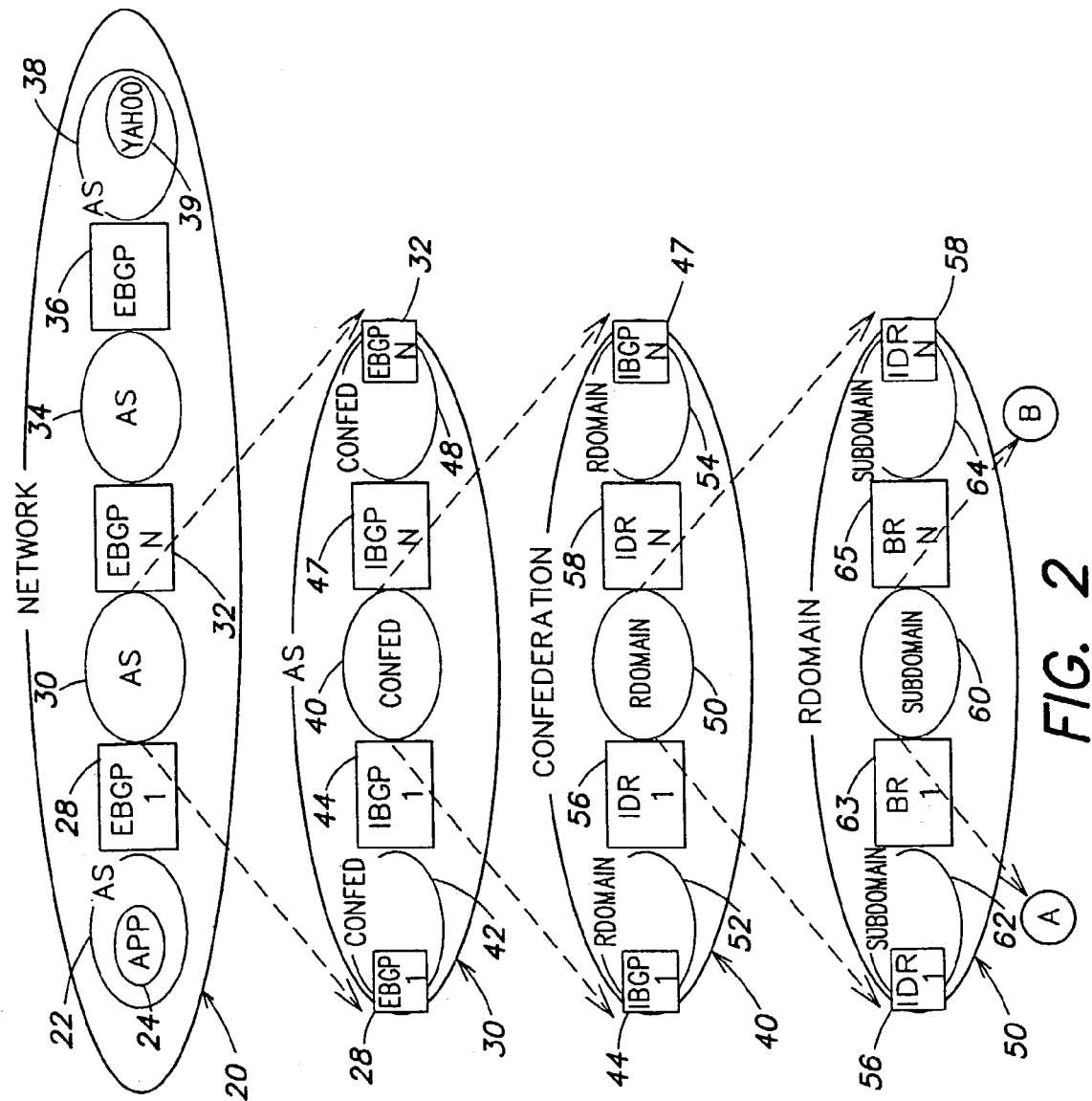
FIGS. 2 and 2A show diagrammatically hierarchical architecture of the communications network of FIG. 1.
Figure 2A:
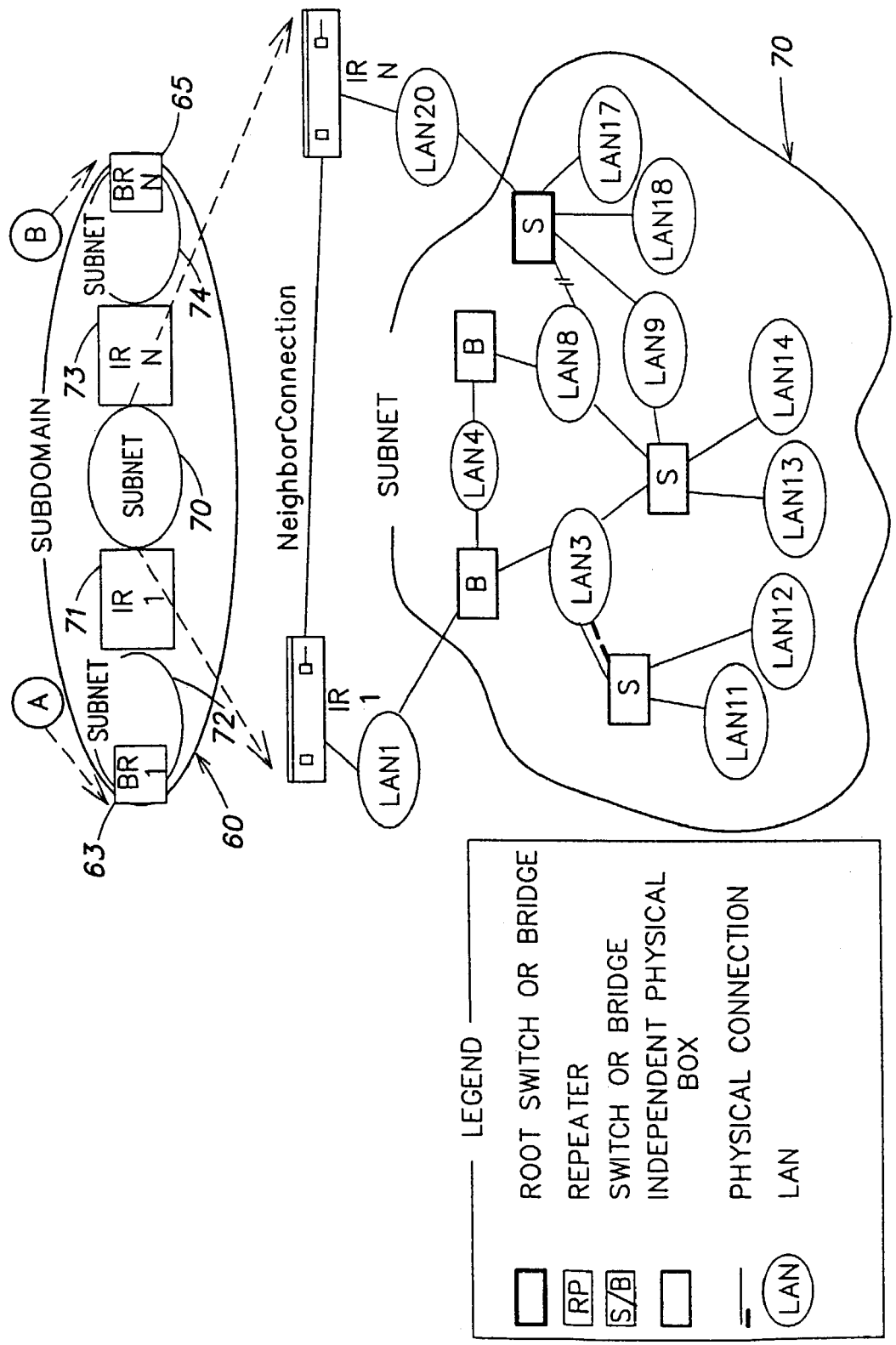

FIGS. 2 and 2A show diagrammatically a hierarchical architecture of the communications network shown in FIG. 1. The individual layers are physical and logical abstractions. A typical global network 20 (e.g., the Internet) is a collection of network devices collaborating together to transmit data. The network devices are logically organized and grouped to allow standard network data forwarding protocols to be used to determine data paths through the network. Additionally, certain devices are deemed "border" devices since they transmit data from one logical grouping to another. Referring to global network 20 in FIG. 2, a person sitting at a PC uses a web browser application 24 within autonomous system (AS) 22. Application 24 requests a web page from a Yahoo! Web server 39 located in AS 38. Modeling of the actual network provides a very rich multi-layer, accurate representation of the network, which a fault diagnosis process can use to diagnose faults.

Internet service providers and telecommunications companies like AT&T, MCI, and Sprint provide and maintain autonomous systems 22,30,34,38, communicating by network routers 28,32 and 36. Routers 28,32 and 36 are organized into logical administrative groupings. The most common protocol used at this level is BGP (Border Gateway Protocol). Routers 28,32 and 36 use an External BGP protocol to organize router information, and are located at borders of the Autonomous Systems.

At the AS level 30, network routers 44 and 47 are again administratively organized into logical groupings called confederations. Routers 44 and 47 use an Internal BGP protocol to organize route information and form the borders of the confederations 40,42, and 48. If all the routers are using the same interior gateway protocol and are centrally located and administered, the AS 30 may not have distinct confederations 40,42 and 48, but function as both a confederation and an AS.

At the confederation level 40, one of many specific interior gateway routing protocols is used to determine routing information for data packets. The use of a given interior gateway routing protocol is confined to a single routing domain 50. The routing protocols include OSPF, RIP, and IS—IS. At routing domain level 50, border routers 56 and 58 are called Inter-Domain Routers since they have the ability to transmit data between distinct routing domains even if the domains use different interior gateway routing protocols. Within a particular interior gateway protocol, border routers may be treated as if they were AS border routers.

Within routing domain 50, a single interior gateway routing protocol is used. If the domain is large enough and the selected protocol supports sub-domains, routing domain 50 may be further broken up into sub-domains 60,62 and 64. OSPF may be used as the interior gateway protocol inside routing domain 50. OSPF allows network administrators to organize a network into yet-smaller administrative groupings, i.e., sub-domains 60, 62 and 64, called Areas. Border routers 63 and 65 at this level are called Area Border Routers, and use the OSPF protocol to determine how to transmit data between OSPF Areas 60, 62 and 64.

Inside an OSPF Area, interior routers use the OSPF protocol to determine the data paths. This is the final logical grouping which uses routers as its data transport mechanism. IP-based subnets 70, 72 and74 are typically defined as the sub-regions inside an OSPF Area. IP subnets 70, 72 and 74 define a common IP addressing space for devices inside the subnet.

At the subnet level 70, data is transmitted from router to router via Layer-2 bridges and switches. Typically, the subnet topology is highly redundant, with numerous physical connections between the bridges and switches. Layer-2 protocol (usually Spanning Tree) is used to determine the single path data will travel between bridges. Only one path will exist between any two devices inside a Subnet in which Spanning Tree is used.

Topology mapper 14 runs topology mapper algorithms for discovering and modeling a single aspect (or set of layers) of the generic model. As the characteristics or capabilities of each network device become known to mapper 14, an appropriate algorithm is executed. A BGP algorithm described in connection with FIG. 4, attempts to discover and model the network at global network level 20, autonomous system level 30, and confederation levels 40. OSPF and RIP algorithms, described in connection with FIGS. 5 and 6, discover and model the network at the Routing Domain, and Sub-Domain levels.

Figure 3:
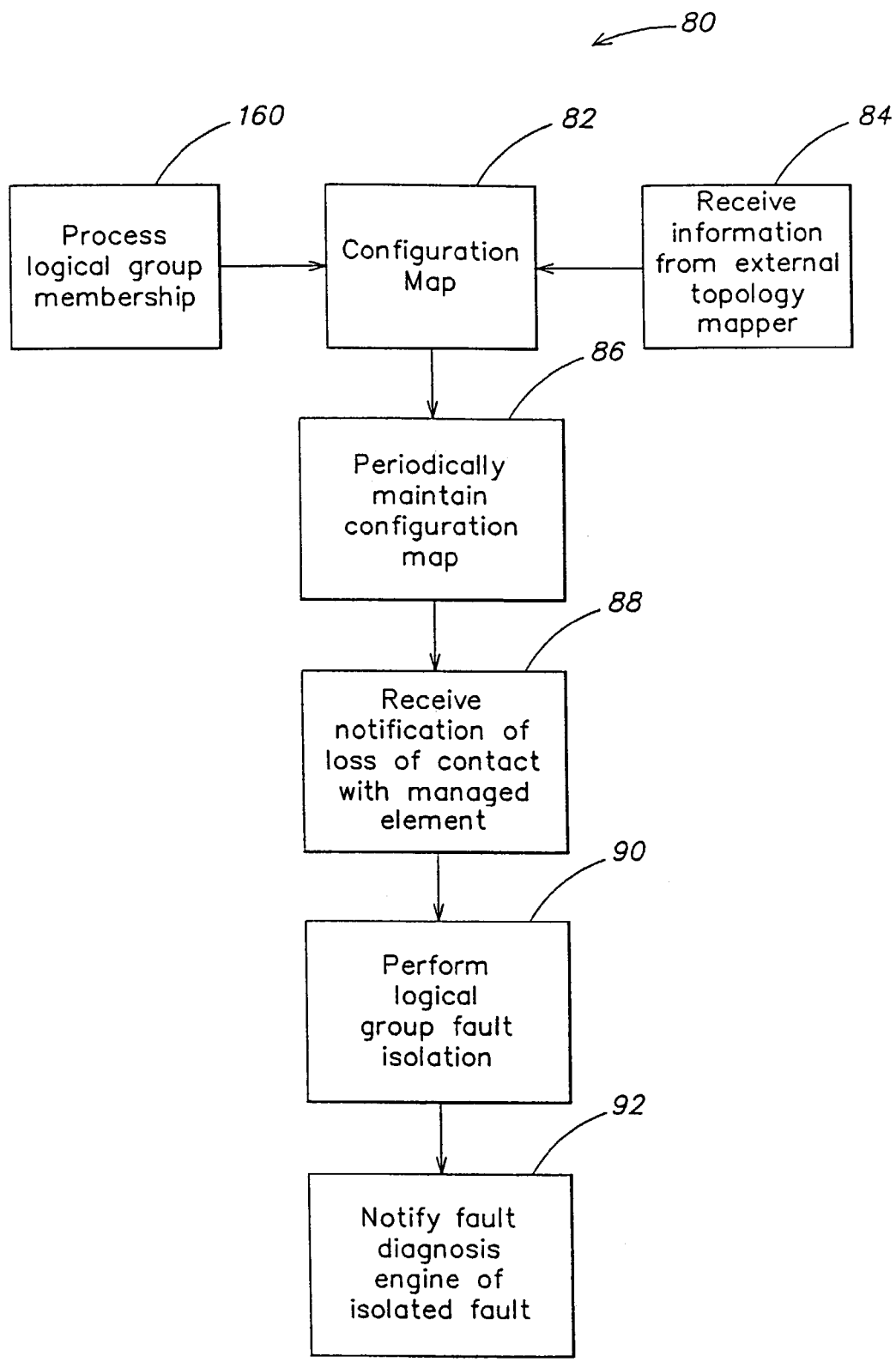
FIG. 3 illustrates a flow diagram of fault status suppression performed by network management system of FIG. 1.

FIG. 3 illustrates a fault status suppression algorithm 80 performed by fault status suppressor 15 of network management system of FIG. 1. Fault status suppressor 15 creates a configuration map 100 (FIG. 4) after receiving network information from topology mapper 14. A suitable embodiment of topology mapper 14 is described in co-pending PCT application PCT/US01/14767, entitled: System and Methods for Constructing Multi-Layer Topological Models of Computer Networks, filed on May 7, 2001, which is incorporated by reference.

Figure 5:
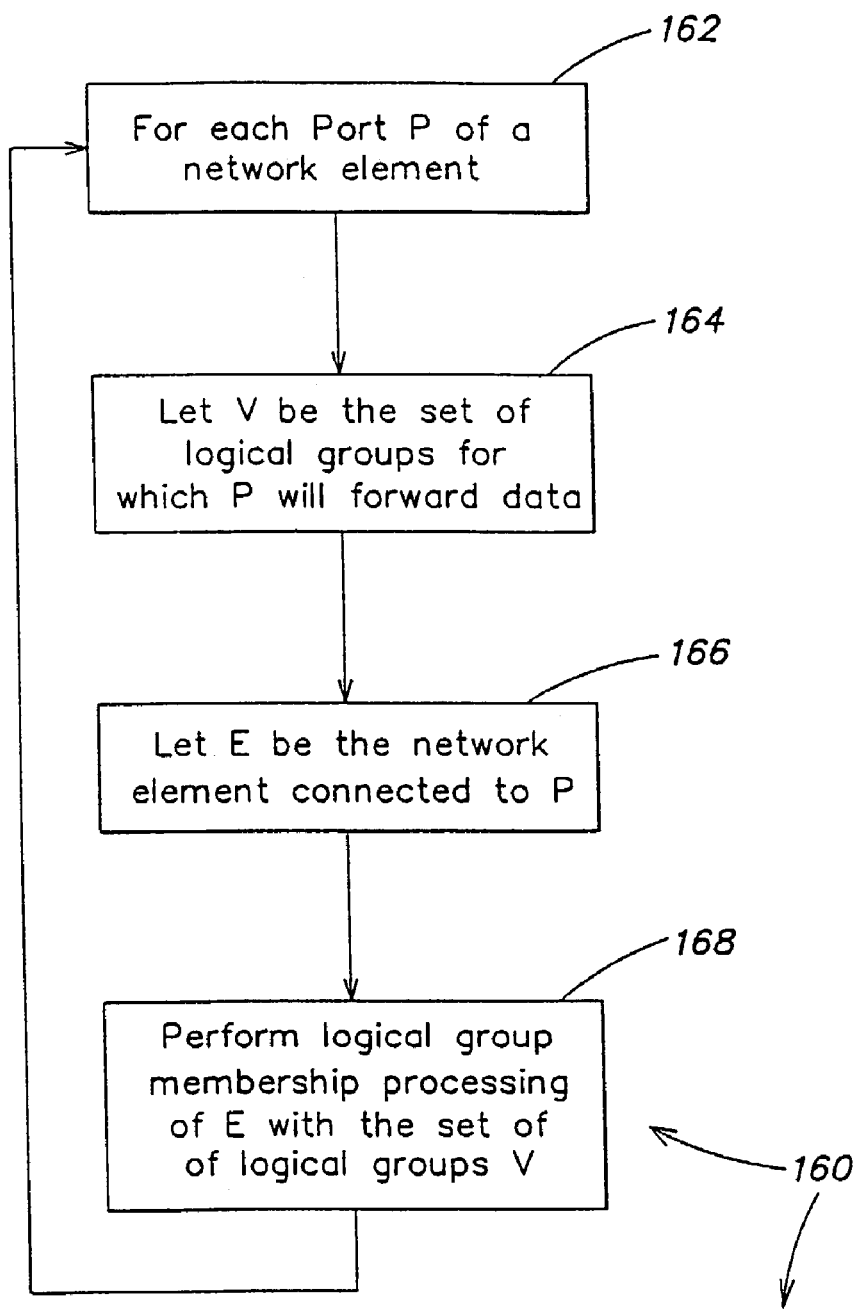
FIGS. 5 and 5A illustrate an algorithm for the VLAN membership processing.
Figure 5A:
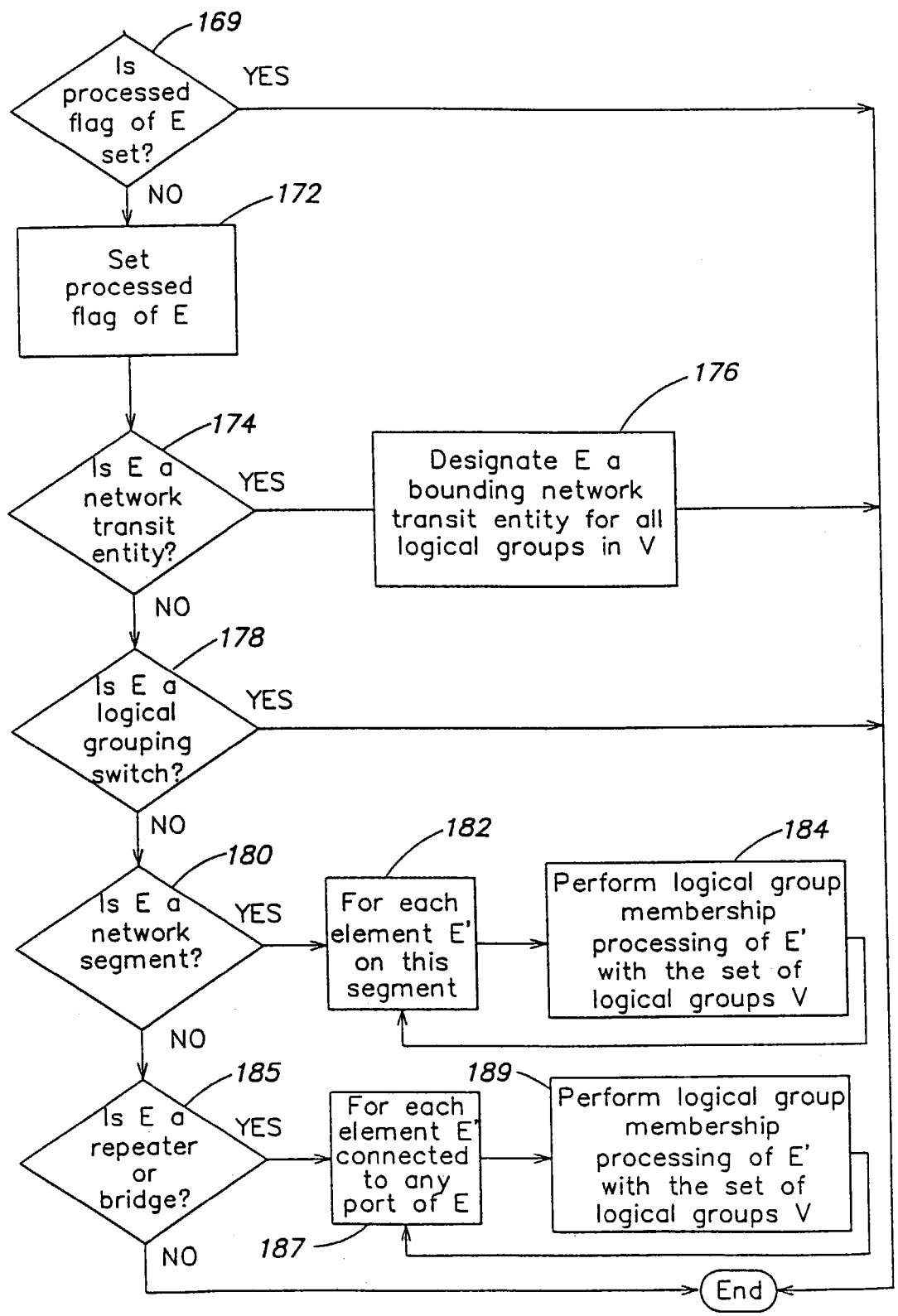

Alternatively, fault status suppressor 15 creates configuration map 100 based on algorithm 160 shown in FIGS. 5 and 5A. Fault status suppressor 15 periodically maintains configuration map 100 by executing algorithm 190 illustrated in FIGS. 6 and 6A. If fault status suppressor 15 receives a notification about a loss of contact with a managed network element (88), it executes a logical group fault isolation (90), described in connection with FIG. 7. After performing fault suppression, fault status suppressor 15 notifies fault diagnosis system 12 (step 92). A suitable embodiment of fault diagnosis system 12 described in detail in the co-pending PCT application PCT/US01/14618, entitled: Systems and Methods for Diagnosing Faults in Computer Networks, filed on 7 May 2001, which is incorporated by reference.

Figure 4:
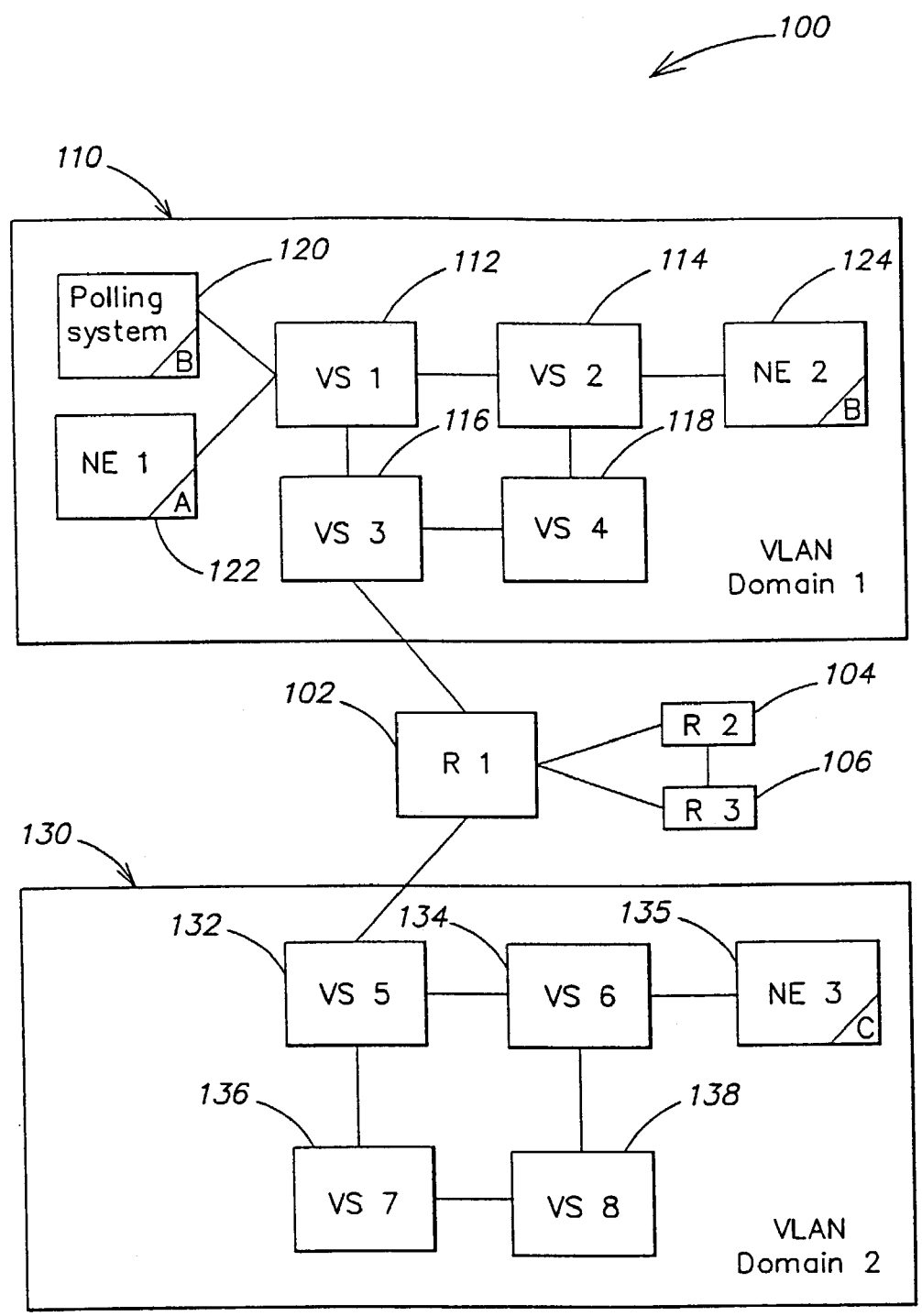
FIG. 4 is a block diagram of a configuration map used in fault status suppression of FIG. 3
Figure 7:
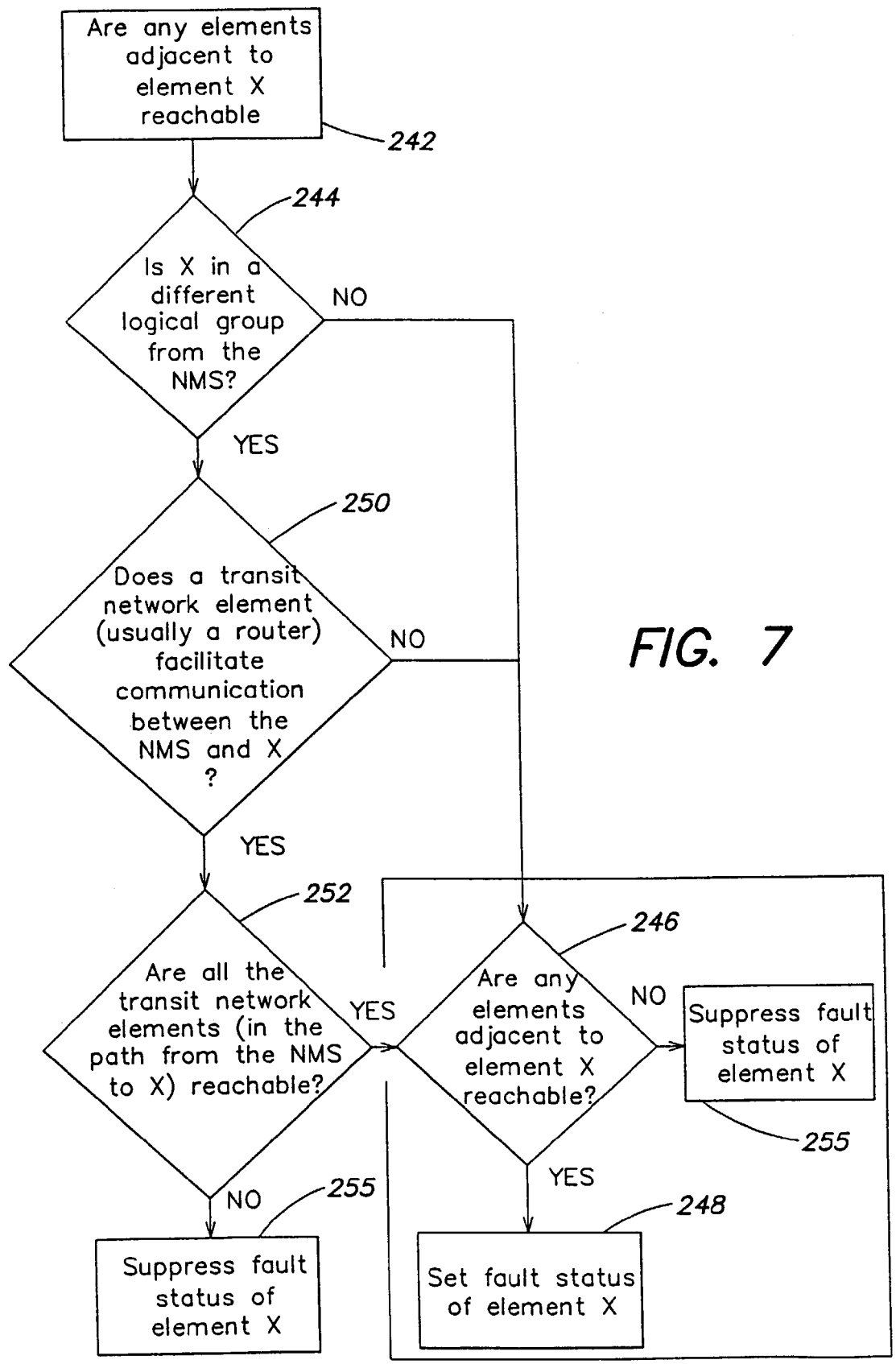
FIG. 7 illustrates a flow diagram of an algorithm for logical group fault isolation.

FIG. 4 illustrates a configuration map 100 used to illustrate a fault suppression algorithm provided in FIG. 7 Configuration map 100 includes a router network with router 102, 104, and 106 connecting VLAN domains 110 and 130. VLAN domain 110 includes VLAN switches 112, 114, 116, and 118, connecting a polling system 120, network element 122, and network element 124. VLAN domain 130 includes VLAN switches 132, 134, 136, and 138 connecting network element 135.

There are three main phases of the invention (1) the initial logical group mapping; (2) logical group maintenance; and (3) fault isolation between logical groups As stated explicitly above, the advantage of this invention is that fault suppression in logically partitioned networks (such as VLANs, VPNs, LAN Emulation over ATM, etc.) in which a bounding network transit entity (such as a router, LAN Emulation server, or any other facility used to transfer traffic from one logical group to another) is at fault is now possible.

FIGS. 5 and 5A illustrate initial logical group configuration mapping. In algorithm 160, the configuration of each network element is evaluated to determine the logical groups and the set of ports that forward data for each group. Then, a model of each logical group is created and associated with models of the ports (already existing in the NMS in some form). Knowledge that the network management system has about the physical connectivity of network elements is used to determine membership. The connectivity knowledge of network management system 10 may be gleaned via an automatic process of topology mapping or through user input, or some combination of both. Sometimes a port may belong to more than one logical group. Furthermore, a logical group may span several network entities. Special network entities (such as routers) are designated to pass traffic from one logical group to another. Logical groups can either contain other logical groups or overlay several logical groups.

If a repeater is found to be connected to a logical group port, all other elements connected to that repeater are considered part of the logical group. If a network transit entity is found to be connected to a logical group port, and that port is configured to forward data from multiple logical groups, that network transit entity is designated a bounding network transit entity for each logical group for which the connected port is forwarding data. The following diagram illustrates this algorithm.

Referring to FIG. 5, algorithm 160 performs VLAN membership processing. In step 162, for each port P of a network element E, V is the set of logical groups for which P will forward data. For network element E, connected to port P, perform logical group membership processing of element E with the set of logical groups V (step 168).

FIG. 5A displays, in detail, the logical group membership processing (step 168 in FIG. 5). If E is a network transit entity, then the algorithm designates E to be a bounding network transit entity for all logical groups in V (step 176). Otherwise, if E is not a logical grouping switch, and is a network segment, the algorithm for each element E' on this segment, performs logical group membership processing of E' with the set of logical groups (steps 182 and 184). If E is a repeater or bridge for each element E' connected to any port of E, the algorithm performs logical group membership processing of E' with the set of logical groups (steps 187 and 189)

In FIGS. 5 and 5A, notably, a network segment represents a "dumb" repeater (i.e. a device without a management agent) or a broadband network link (such as a coax segment) with multiple network elements tapped into it. In either case, the set of elements in such a segment can generally be determined by employing well known network discovery techniques. Alternatively, the elements in a segment can be indicated by a user of the NMS. For repeater and bridge processing, the set of elements connected to the repeater or bridge is determined by, first, getting a list of ports on the device, and then finding the network element to which each port connects. The connected network element, of course, may be a network segment.

In the preferred implementation, the NMS would have models that represent network elements and the interfaces (also referred to as ports) used by these elements to connect to other elements, and associations would exists between port models and the elements to which they connect. Models would be created for each logical group. Associations would be made between the logical group member models and the ports that forward traffic for those logical groups.

Figure 4A:
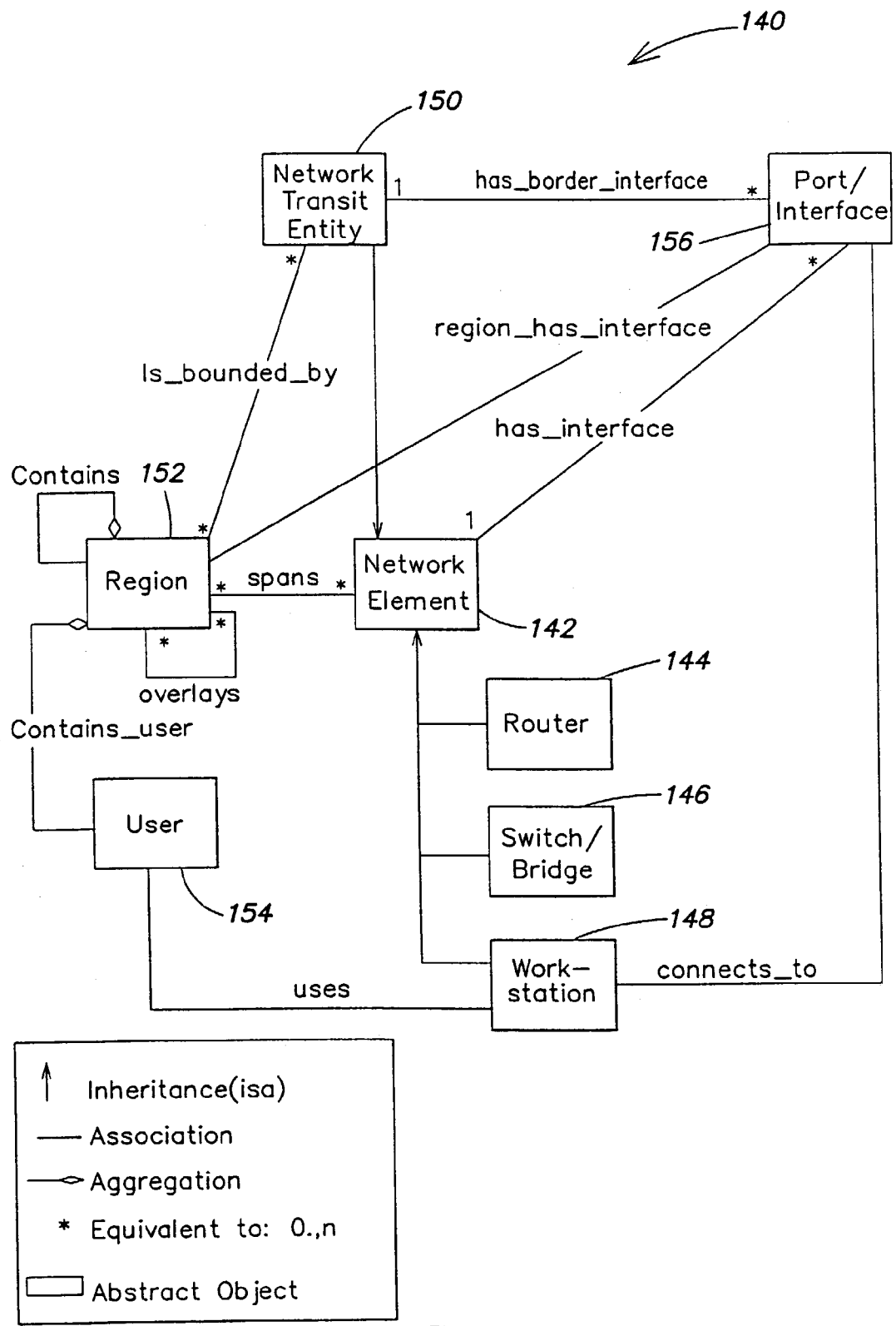
FIG. 4A is a semantic data model used when constructing the configuration map of FIG. 4.

FIG. 4A illustrates a semantic data model used when implementing fault isolation and suppression. This is the definition of the model of the configuration map (82 of FIG. 3) that will be built (160 and 84 of FIG. 3) and maintained (step 86 of FIG. 3), and will be accessed by the logical group fault isolation algorithm (90 of FIG. 3). Regions 152 are models of logical network groups, and may be in contains or overlays association with other Regions (representing the relationship between the regions), and may be in is_bounded_by associations with network transit entity models 150. The interface models 156 of the network transit entities 150 which border regions are in has_border_interface associations with the network transit entity models 150, and are in region_has_interface associations with the regions they border. Regions 152 are in spans associations with the network elements 142 that have ports in these regions or logical groups. Routers 144, Switches 146, and Workstations 148 are more specific types of network element models that may be used to represent specific elements. User models 154 may be in uses associations with the models of the workstations 148 they use.

Figure 6:
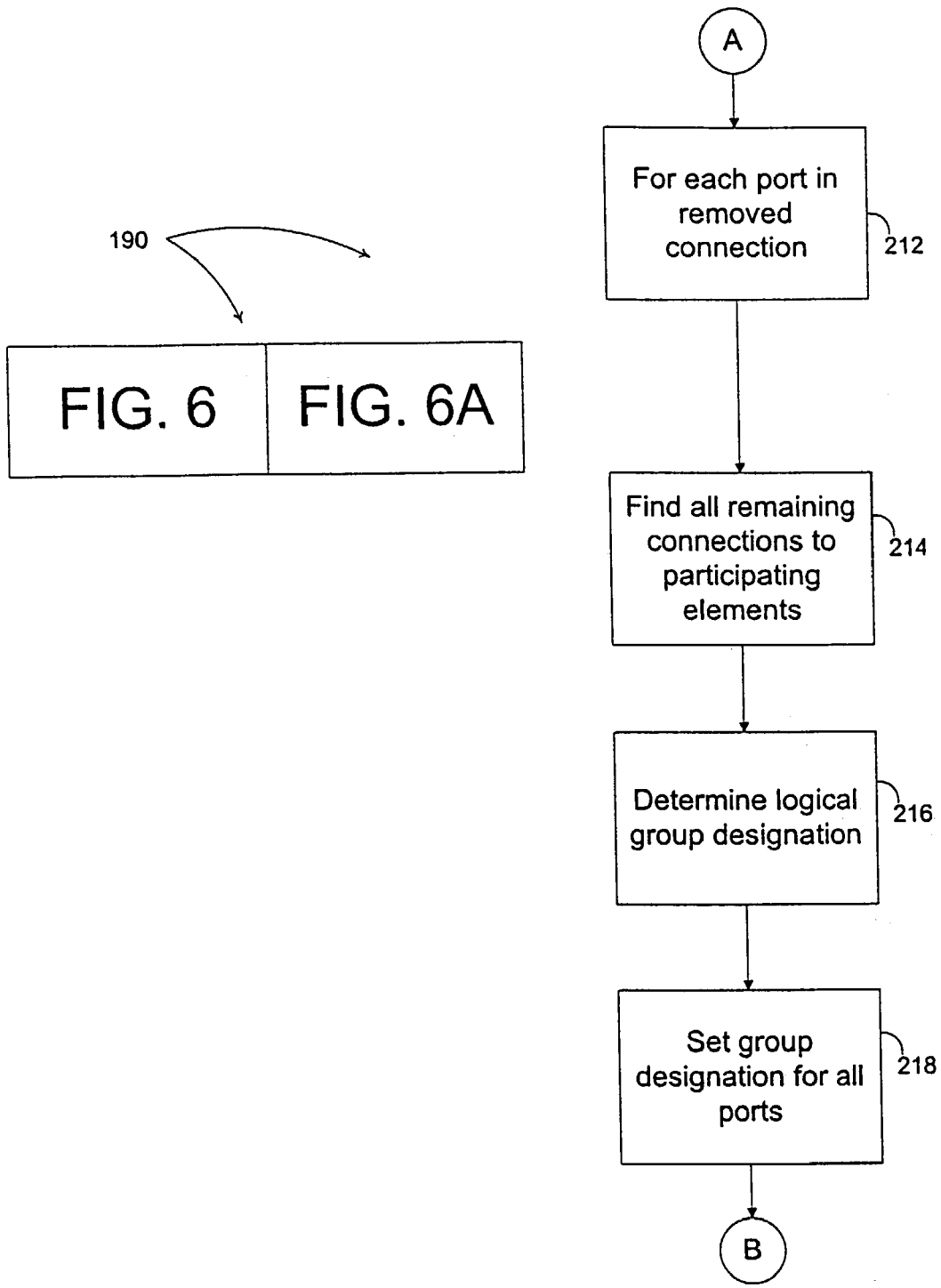
FIGS. 6 and 6A illustrate an algorithm for logical group configuration maintenance.

FIG. 6. illustrates logical group configuration maintenance. To understand logical group configuration processing, whether it is initial construction or maintenance of the map, one must realize that, though the algorithm is the same, specific processing code is required to process each type of logical grouping, such as VLANs or VPNs. Detecting logical group changes requires specific detectors for each logical grouping. For example, detecting changes in a 802.1Q VLAN network (or VLAN Domain) is done by 1) monitoring the port connectivity of the VLAN switches as maintained by the Network Management System (see initial logical group configuration mapping), and
2) periodically polling the "egress port list" object of the VLAN switches to detect VLAN membership changes on the ports of a switch.

This is important because elements that participate in the logical grouping protocol (e.g. 802.1Q) can assign group memberships to individual ports. For this reason, the port membership of each VLAN switch must be periodically checked.

Whereas elements that do not participate in the logical grouping protocol derive their logical group membership from the ports of participating elements that they are connected to, either directly or indirectly, via a repeater. So, all ports of a particular non-participating element have the same group membership, and that group membership doesn't change until a port of this element is either connected to, or disconnected from another element.

Figure 6A:
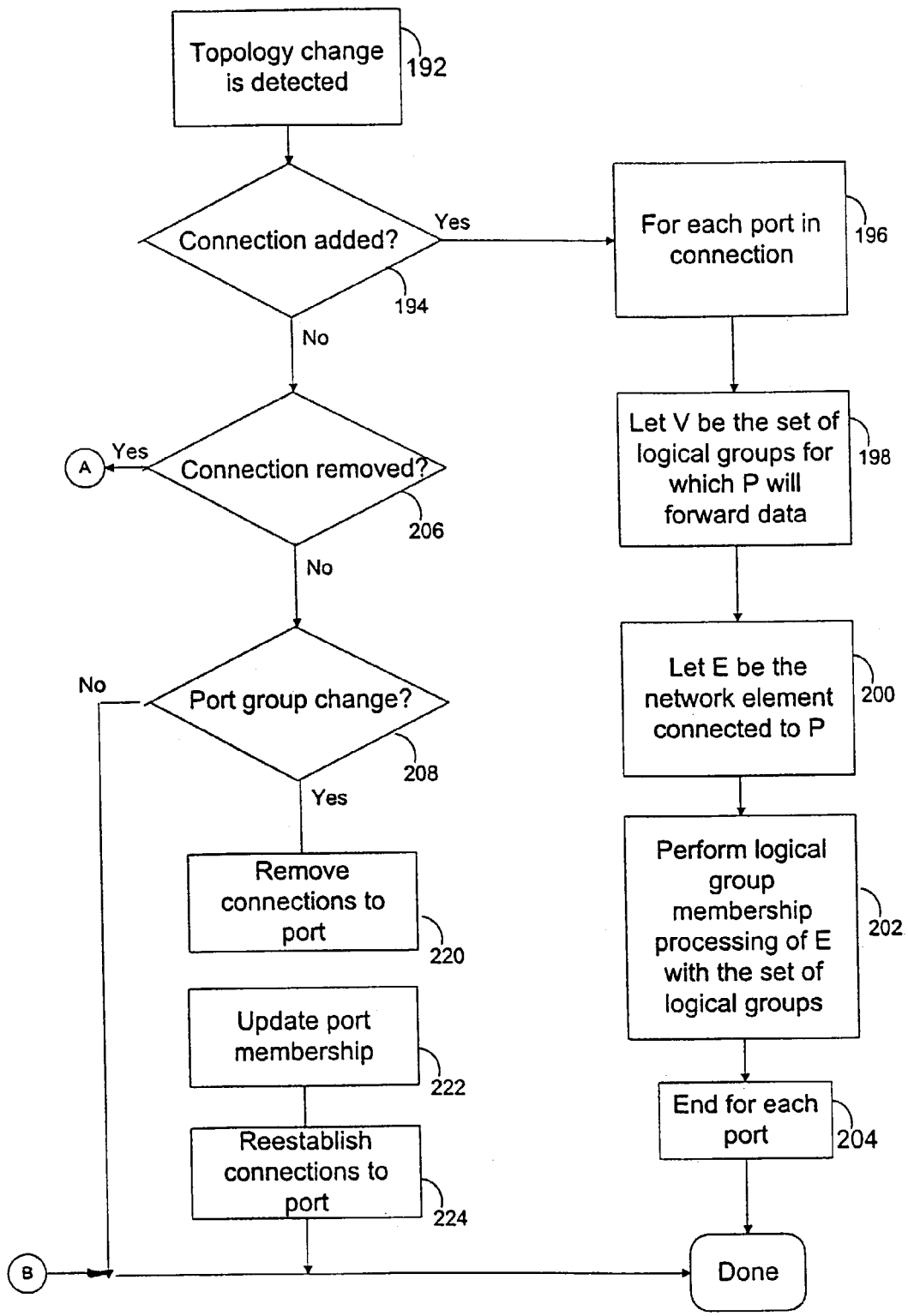

Referring the FIGS. 6 and 6A, when a new connection to a port with logical group designation is detected (i.e., topology change in step 192), the procedure to update the configuration map is performed (as shown in FIG. 6A). This procedure is very similar to procedure 160, except that, instead of performing the algorithm for each port of the network element (step 162), only the port that was newly connected is examined in process 190.

Still referring the FIG. 6, for each port in a removed connection (212) the system performs steps 214 through 218. If there is no connection removed, but there is a port group change (208), the system performs steps 220 through 224. If there is a connection added (194), the system performs steps 196 through 204.

In general, as shown in FIGS. 6 and 6A, when a connection to a port with logical group designation is removed, the procedure is more complex. Data networks are generally built with a certain amount of redundancy to reduce the risk of complete loss of service. For this reason, some network elements not participating in the logical grouping protocol may derive their group designation via multiple connections (direct or indirect, via a repeater) to one or more participating elements. Therefore, when a connection is removed between a port of a participating element and a non-participating element, the procedure cannot infer that the non-participating element's logical grouping will change. Instead, all connections to participating elements must be determined, and the logical grouping re-established. Finding all the connections involves traversing a "connectivity graph" (which can be cyclical) until a participating element, a logical group border element, or an end-node is reached.

Once the logical grouping of the non-participating element is established, it is propagated to all connected non-participating, non-bordering elements. This is done by changing the group membership of the ports of this non-participating element, and allowing the "port membership change" algorithm (190) run.

In addition to connectivity changes detected by the NMS, port configuration changes on individual network elements will cause changes to element's logical group designations. If a port is moved from logical group "A" to logical group "B", the designation of all elements connected to the port must be updated to group "B". As described above, the redundant connectivity in modern networks makes this no simple task either. For example, a repeater is connected to port of two participating elements; one port is a member of group "A" and "B", the other port is only a member of "B". Therefore, the repeater is a member of group "A" and "B". Now, if the group membership of the second port changes from "B" to "A", the membership of the repeater should not change.

To handle changes in port membership effectively, the algorithm first temporarily removes all connections to this port, causing the "remove connection" algorithm (described in text above) to run. Then, the algorithm updates the port group membership. Finally, the algorithm adds the connection back, causing the "new connection" algorithm (steps 196 through 204) to run.

FIG. 7 illustrates logical group fault isolation. Logical groups exist to cause affects on traffic as it passes from one network element to another, thereby partitioning the physical network. Certain network elements enforce and participate in specific logical group settings. Each network element has a forwarding strategy with regard to each of the logical groups that it understands. As stated earlier, the Dev et al. al. patent assumes that if an NMS can communicate with any physically adjacent to a device.

When the NMS fails to communicate with a managed element either during a regular "ping" (are you alive) interval, or while performing some other function involving communication with the element, the new method of fault suppression is attempted. This method, as shown in the diagram below, first determines the logical group membership of the unreachable element in relation to the logical group membership of the communication subsystem of the NMS. If the two elements are in different logical groups, the NMS will try to contact all the bounding network transit entities between the two logical groups. If any bounding network transit entity cannot be contacted, the fault status of the unreachable element will be suppressed. Otherwise, if all bounding network transit entities can be contacted by the NMS, the fault isolation algorithm invented by Dev, et al. al. will be invoked.

Referring to FIGS. 4 and 7, network 100 consists of two VLAN domains 110 and 130 and routers 102, 104, 106. Router 102 routes between domains 110 and 130 and between VLANs of any one domain. Specifically, router 102 is VLAN-aware and configured to forward data between the VLANs A and B VLAN in Domain 1. The polling system of the NMS and network element NE2 are in VLAN B; whereas network element NE1 is in VLAN A. If the polling system (NMS) cannot reach NE1 because of a failure in R1, an NMS using only steps 246, 248 and 255 (FIG. 7) to set the fault status of NE1 and also the router element. In fact, the NMS will set the fault status on all elements outside of VLAN B (and also physically adjacency to an element in VLAN B) within Domain 1.

An NMS using steps 250 through 255 will suppress the fault status of NE1 (as well as those elements outside of VLAN B within Domain 1). Failure of polling system 120 to contact NE2 will not cause the evaluation of the fault status of R1, because, since NE2 and polling system 120 are both in VLAN B, R1 is not needed for the transmission of data between the two network elements. Therefore, a simple evaluation of the adjacent network elements is sufficient for fault isolation.

If polling system 120 fails to contact NE3, evaluation of the adjacent network elements is also sufficient. Router 102 is necessary for the transmission of data between polling system 120 and NE3, but, because NE3 is in a different domain, the fault status of R1 will eventually be considered by the algorithm if this element is at fault. The algorithm will continue to evaluate the adjacent network elements until a reachable element is found. If router 102 is not functioning, none of the elements in VLAN Domain 2 will be reachable from the polling system. Because router 102 is adjacent to switch 132, the algorithm will evaluate the status of router 102 while determining the status of switch 132.

As shown above, routed networks are generally hierarchical in nature. A packet transmitted from an element in one segment destined for another segment must go up through repeaters, bridges, and possibly several layers of routers, before going back down through more bridges and repeaters before reaching its destination. The routers in the network are the boundaries of each logical group (subnet, VLANS, VPN, etc.). A further improved fault isolation process checking the status of each router in the path from the NMS to an unreachable device first, can isolate the fault to a particular logical group. Any router in the path that is unreachable, and yet has a reachable adjacent router would be the subject for the linear search known in prior art. This improved algorithm can substantially decrease the number of elements that must be polled during the fault isolation process. This translates into a faster determination of the faulty element. However, the algorithm requires the NMS to have a knowledge of which routers are required for data transmission between the polling system and any managed network element. This knowledge can be provided by topology mapper 14 described in co-pending PCT application PCT/US01/14767, entitled: System and Methods for Constructing Multi-Layer Topological Models of Computer Networks, filed on May 7, 2001, which is incorporated by reference.

The present invention may also be used together with fault diagnosis system 12 described in detail in the co-pending PCT application PCT/US01/14618 entitled "Systems and Methods for Diagnosing Faults in Computer Networks" filed on May 7, 2001, which is incorporated by reference.

Numerous other embodiments not described in detail here can apply the principles described to particular applications and are within the scope of the claims.

What is claimed is:

1. A method of fault status suppression in a communication network, wherein the communication network includes a plurality of network elements, wherein the communication network is organized into a plurality of logical groups, wherein each of the plurality of logical groups includes one or more of the plurality of network elements, wherein one or more of the plurality of network elements in one of the plurality of logical groups is virtually partitioned from at least one network element in another of the plurality of logical groups, wherein at least one of the plurality of logical groups includes a detector for receiving fault data, the method comprising:

receiving fault data from the detector identifying a fault status of a first network element;

determining a first logical group from among the plurality of logical groups for said detector and a second logical group from among the plurality of logical groups for said first network element; and suppressing a fault on said first network element when the first logical group of said detector and the second logical group of said first network element are different and there is a fault on a second network element providing a communication path between said first and second logical groups.

2. The method of claim 1 wherein said detector is a polling system.

3. The method of claim 1 wherein the second network element includes a network transit element.

4. The method of claim 3 wherein said network transit element includes a router.

5. The method of claim 1 wherein the plurality of logical groups include virtual local area networks.

6. The method of claim 1 wherein the plurality of logical groups include virtual private networks.

7. A system for fault status suppression in a communication network, wherein the communication network includes a plurality of network elements, wherein the communication network is organized into a plurality of logical groups, wherein each of the plurality of logical groups includes one or more of the plurality of network elements, wherein one or more of the plurality of network elements in one of the plurality of logical groups is virtually partitioned from at least one network element in another of the plurality of logical groups, wherein at least one of the plurality of logical groups includes a detector for receiving fault data, the system comprising:

means for receiving fault data from the detector identifying fault status of a first network element;

means for determining a first logical group from among the plurality of logical groups for said detector and a second logical group from among the plurality of logical groups for said first network element; and means for suppressing fault on said first network element when the first logical group of said detector and the second logical group of said first network element are different and there is a fault on a second network element providing communication between said first and second logical groups.

8. A system for fault status suppression in a communication network, wherein the communication network includes a plurality of network elements, wherein the communication network is organized into a plurality of logical groups, wherein each of the plurality of logical groups includes one or more of the plurality of network elements, wherein one or more of the plurality of network elements in one of the plurality of logical groups is virtually partitioned from at least one network element in another of the plurality of logical groups, the system comprising:

a detector that is included in at least one of the plurality of logical groups, said detector being constructed and arranged to identify a fault status of a first network element;

a mapper constructed and arranged to determine a first logical group from among the plurality of logical groups for said detector and a second logical group from among the plurality of logical groups for said first network element; and a fault status suppressor constructed and arranged to suppress a fault on said first network element when the first logical group of said detector and the second logical group of said first network element are different and there is a fault on a second network element providing communication between said first and second logical groups.

9. The system of claim 8 wherein said detector is a polling system.

10. The system of claim 8 wherein the second network element includes a network transit element.

11. The system of claim 10 wherein said network transit element includes a router.

12. The system of claim 8 wherein the plurality of logical groups include virtual local area networks.

13. The system of claim 8 wherein the plurality of logical groups include virtual private networks.

14. The system of claim 8 wherein said mapper is associated with a network management system.

15. A method of fault status suppression in a communication network, wherein the communication network includes a plurality of network elements, wherein the communication network is organized into a plurality of logical groups, wherein each of the plurality of logical groups includes one or more of the plurality of network elements, wherein one or more of the plurality of network elements in one of the plurality of logical groups is virtually partitioned from at least one network element in another of the plurality of logical groups, wherein at least one of the plurality of logical groups includes a detector for receiving fault data, the method comprising:

receiving fault data from the detector identifying a fault status of a first network element;

determining a first logical group of said detector from among the plurality of logical groups;

determining a second logical group of said first network element from among the plurality of logical groups; and suppressing a fault on said first network element when said first logical group of said detector and second said logical group of said first network element are different from one another and there is a fault on a second network element providing a communication path between said first logical group of said detector and said second logical group of said first network element.

* * * * *